United States Patent
Ko et al.

(10) Patent No.: US 10,158,562 B2
(45) Date of Patent: Dec. 18, 2018

(54) APPARATUSES AND METHODS FOR HANDOVERS IN A WIRELESS MESH NETWORK

(71) Applicant: MEDIATEK INC., Hsin-Chu (TW)

(72) Inventors: Li-Chun Ko, Taipei (TW); Rongsheng Huang, Fremont, CA (US)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/349,105

(22) Filed: Nov. 11, 2016

(65) Prior Publication Data
US 2017/0135021 A1    May 11, 2017

Related U.S. Application Data

(60) Provisional application No. 62/253,730, filed on Nov. 11, 2015.

(51) Int. Cl.
| | |
|---|---|
| *H04L 12/721* | (2013.01) |
| *H04W 40/00* | (2009.01) |
| *H04W 4/80* | (2018.01) |
| *H04W 72/12* | (2009.01) |
| *H04W 8/00* | (2009.01) |
| *H04W 36/02* | (2009.01) |
| *H04W 84/18* | (2009.01) |

(52) U.S. Cl.
CPC .......... *H04L 45/32* (2013.01); *H04W 40/005* (2013.01); *H04W 4/80* (2018.02); *H04W 8/005* (2013.01); *H04W 36/023* (2013.01); *H04W 72/12* (2013.01); *H04W 84/18* (2013.01)

(58) Field of Classification Search
CPC ..... H04W 36/36; H04W 72/12; H04W 72/00; H04L 45/026; H04L 45/32; H04L 47/17; H04L 43/16
See application file for complete search history.

(56) References Cited

U.S. PATENT DOCUMENTS

| | | | |
|---|---|---|---|
| 6,895,450 B2 | 5/2005 | Mahany et al. | |
| 8,520,597 B2 | 8/2013 | Cheon et al. | |
| 2006/0002320 A1* | 1/2006 | Costa-Requena | ..... H04L 12/189 370/312 |
| 2007/0050645 A1* | 3/2007 | Siegmund | ............... H04L 12/12 713/300 |

(Continued)

FOREIGN PATENT DOCUMENTS

WO    2014/025671 A1    2/2014

*Primary Examiner* — Chi Ho A Lee
(74) *Attorney, Agent, or Firm* — McClure, Qualey & Rodack, LLP (57) ABSTRACT

A wireless communication device, serving as a destination node of one or more data packets propagated in a wireless mesh network, is provided. The wireless communication device includes a wireless transceiver and a controller. The wireless transceiver performs wireless transmission and reception in the wireless mesh network. The controller selects a first relay node to serve as a friend node for the wireless communication device and to store the data packets which arrive when the wireless communication device operates in a sleep mode, and broadcast, via the wireless transceiver, a notification message in the wireless mesh network when selecting a second relay node to serve as the friend node for the wireless communication device.

13 Claims, 7 Drawing Sheets

(56) References Cited

U.S. PATENT DOCUMENTS

| | | | | |
|---|---|---|---|---|
| 2008/0031174 A1* | 2/2008 | Saifullah | ................ | H04B 7/155 370/311 |
| 2010/0034181 A1* | 2/2010 | Shinozaki | ......... | H04L 29/12301 370/338 |
| 2010/0177672 A1* | 7/2010 | Dayal | ................... | H04W 52/46 370/311 |
| 2011/0142041 A1* | 6/2011 | Imai | ...................... | H04L 45/124 370/389 |
| 2016/0134794 A1* | 5/2016 | Grabau | ............. | G06K 9/00771 348/155 |
| 2016/0142974 A1* | 5/2016 | Lindoff | ................... | H04B 1/40 370/311 |
| 2016/0262102 A1* | 9/2016 | Sakata | ............... | H04B 7/15542 |

* cited by examiner

APPARATUSES AND METHODS FOR HANDOVERS IN A WIRELESS MESH NETWORK

CROSS REFERENCE TO RELATED APPLICATIONS

This Application claims priority of U.S. Provisional Application No. 62/253,730, filed on Nov. 11, 2015, the entirety of which is incorporated by reference herein.

BACKGROUND OF THE APPLICATION

Field of the Application

The application relates generally to wireless communications, and more particularly, to apparatuses and methods for handovers in a wireless mesh network supporting only the flooding-based propagation mechanism.

Description of the Related Art

The use of wireless mesh networks has increased in recent years to improve the range of wireless communications. A wireless mesh network typically includes a plurality of wireless nodes that communicate with one another to propagate data packets. For example, in a multi-hop wireless mesh network, a data packet is propagated from a source node, or an originating node, to a destination node by "hopping" from one wireless node to another until the data packet reaches the destination node. As such, each node in a wireless mesh network operates as both a receiver and a transmitter to communicate data packets between intermediate nodes.

Flooding is a common network operation in which a data packet is sent by one node to every other node in a wireless mesh network. Each wireless node that receives that data packet, and hasn't received it before, forwards it to every other known neighboring node except for the originating node. The flooding of data packets can be performed in either unicast or broadcast transmissions. Unicast transmissions are point-to-point, one node to another, with an acknowledgment packet sent back as a reply. Unicast transmissions are a reliable means of communication, but they can be problematic in very dense networks because the number of unicast packets needed to perform the flooding operation increases quadratically with the number of nodes in a wireless mesh network. Broadcast transmissions are point-to-multipoint, one node to every other node within the range of wireless communications. In a broadcast transmission, the number of data packets necessary to flood increases linearly with the number of nodes. In this regard, flooding with broadcast transmissions is more efficient than flooding with unicast transmissions. However, broadcast transmissions do not acknowledge receipt of data packets, so they are considered less reliable than unicast transmissions.

BRIEF SUMMARY OF THE APPLICATION

In a first aspect of the application, a wireless communication device, serving as a destination node of one or more data packets propagated in a wireless mesh network, is provided. The wireless communication device comprises a wireless transceiver and a controller. The wireless transceiver is configured to perform wireless transmission and reception in the wireless mesh network. The controller is configured to select a first relay node to serve as a friend node for the wireless communication device and to store the data packets which arrive when the wireless communication device operates in a sleep mode, and broadcast, via the wireless transceiver, a notification message in the wireless mesh network when selecting a second relay node to serve as the friend node for the wireless communication device.

In a second aspect of the application, a handover method for a wireless communication device serving as a destination node of one or more data packets propagated in a wireless mesh network is provided. The handover method comprises the steps of: selecting a first relay node to serve as a friend node for the wireless communication device and to store the data packets which arrive when the wireless communication device operates in a sleep mode; and broadcasting a notification message in the wireless mesh network when selecting a second relay node to serve as the friend node for the wireless communication device.

In a third aspect of the application, a wireless communication device, serving as a relay node or a source node of one or more data packets propagated in a wireless mesh network, is provided. The wireless communication device comprises a wireless transceiver and a controller. The wireless transceiver is configured to perform wireless transmission and reception in the wireless mesh network. The controller is configured to perform a first handover method or a second handover method in response to receiving, via the wireless transceiver, a notification message indicating that a friend node for a destination node of the data packets has been re-selected from a first relay node to a second relay node. The first handover method comprises: discarding the data packets which are stored for the destination node when the wireless communication device is configured to serve as the first relay node, and resending the data packets via the wireless transceiver when the wireless communication device is configured to serve as the source node which originated the propagation of the data packets. The second handover method comprises: clearing a message cache corresponding to the destination node when the wireless communication device is configured to serve as a relay node other than the first relay node, and forwarding, via the wireless transceiver, the data packets when the wireless communication device is configured to serve as the first relay node.

In a fourth aspect of the application, a handover method for a wireless mesh network, wherein the wireless mesh network comprises a wireless communication device serving as a relay node or a source node of one or more data packets propagated in the wireless mesh network is provided. The handover method comprises the steps of: in response to receiving, by the wireless communication device, a notification message indicating that a friend node for a destination node of the data packets has been re-selected from a first relay node to a second relay node, discarding, by the wireless communication device, the data packets which are stored for the destination node when the wireless communication device is configured to serve as the first relay node, and resending, by the wireless communication device, the data packets when the wireless communication device is configured to serve as the source node which originated the propagation of the data packets; or clearing, by the wireless communication device, a message cache by the wireless communication device corresponding to the destination node when the wireless communication device is configured to serve as a relay node other than the first relay node, and forwarding, by the wireless communication device, the data packets when the wireless communication device is configured to serve as the first relay node.

Other aspects and features of the application will become apparent to those with ordinary skill in the art upon review of the following descriptions of specific embodiments of the wireless communication devices and handover methods.

BRIEF DESCRIPTION OF THE DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The Bluetooth specifications are used to teach the spirit of the application, and the application is not limited thereto.

Figure 1:
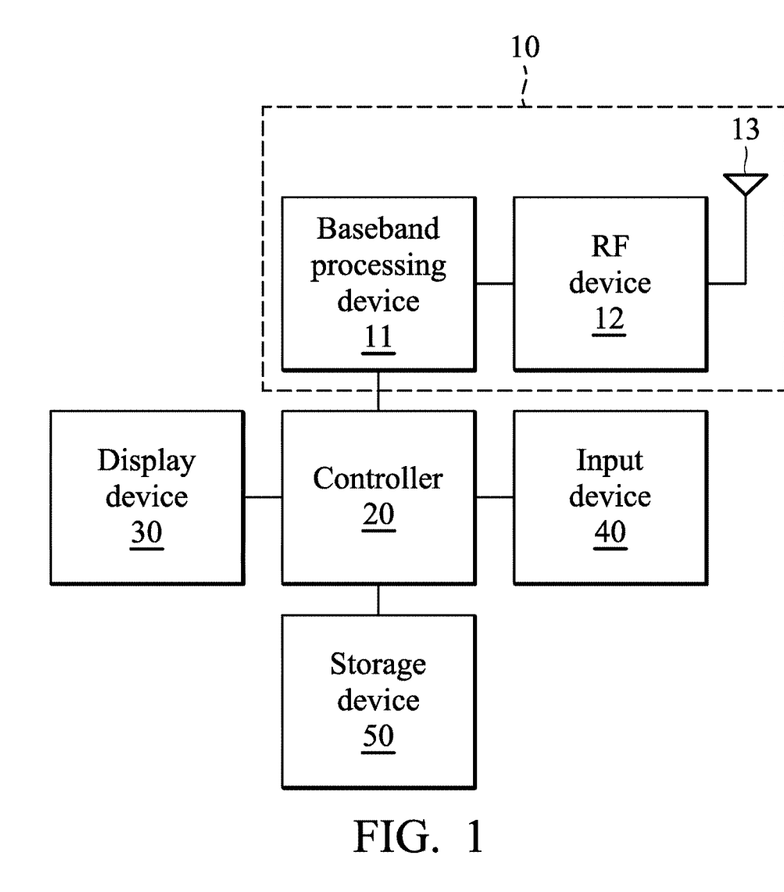
FIG. 1 is a block diagram illustrating a wireless communication device according to an embodiment of the application.

FIG. 1 is a block diagram illustrating a wireless communication device according to an embodiment of the application. The wireless communication device includes a wireless transceiver 10, a controller 20, a display device 30, an input device 40, and a storage device 50. For example, the wireless communication device may be a mobile phone, panel Personal Computer (PC), notebook, smart TV, gaming console, or any computing device which supports wireless communications, such as Bluetooth communications.

The wireless transceiver 10 includes a baseband processing device 11, a Radio Frequency (RF) device 12, and an antenna 13. The baseband processing device 11 may contain multiple hardware components to perform baseband signal processing, including Analog-to-Digital Conversion (ADC)/Digital-to-Analog Conversion (DAC), gain adjusting, modulation/demodulation, encoding/decoding, and so on. The RF device 12 may receive RF wireless signals via the antenna 13, convert the received RF wireless signals to baseband signals, which are processed by the baseband processing device 11, or receive baseband signals from the baseband processing device 11 and convert the received baseband signals to RF wireless signals, which are later transmitted via the antenna 13. The RF device 12 may also contain multiple hardware components to perform radio frequency conversion. For example, the RF device 12 may comprise a mixer to multiply the baseband signals with a carrier oscillated in the radio frequency of the supported wireless technologies, wherein the radio frequency may be 2.4 to 2.485 GHz utilized in the Bluetooth technology, or 2.4 GHz, 3.6 GHz, 4.9 GHz, or 5 GHz utilized in the WiFi technology, or another radio frequency, depending on the wireless technology in use.

The controller 20 may be a general-purpose processor, Micro-Control Unit (MCU), Digital Signal Processor (DSP), application processor, or the like, which includes various circuitry for providing the function of data processing and computing, controlling the wireless transceiver 10 for wireless communications, sending a series of frame data (e.g. representing text messages, graphics, images, etc.) to the display device 30, receiving signals from the input device 40, or storing and retrieving data to and from the storage device 50. In particular, the controller 20 coordinates the aforementioned operations of the wireless transceiver 10, the display device 30, the input device 40, and the storage device 50 for performing the method of the present application. In another embodiment, the controller 20 can be software or firmware or program commands that can be executed by a general-purpose processor, Micro-Control Unit (MCU), Digital Signal Processor (DSP), application processor, or the like, to perform the aforementioned operations of the wireless transceiver 10, the display device 30, the input device 40, and the storage device 50 for performing the method of the present application.

As will be appreciated by persons skilled in the art, the circuitry will typically comprise transistors that are configured in such a way as to control the operation of the circuitry in accordance with the functions and operations described herein. As will be further appreciated, the specific structure or interconnections of the transistors will typically be determined by a compiler, such as a register transfer language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

In another embodiment, the controller 20 may be incorporated into the wireless transceiver 10, serving as a baseband processor.

The display device 30 may be a Liquid-Crystal Display (LCD), Light-Emitting Diode (LED) display, or Electronic Paper Display (EPD), etc., for providing a display function. Alternatively, the display device 30 may further include one or more touch sensors disposed thereon or thereunder for sensing touches, contacts, or approximations of objects, such as fingers or styluses.

The input device 40 may include one or more buttons, a keyboard, a mouse, a touch pad, a video camera, a microphone, and/or a speaker, etc., serving as the Man-Machine Interface (MIMI) for interaction with users.

The storage device 50 is a non-transitory machine-readable storage medium, including a memory, such as a FLASH memory or a Non-volatile Random Access Memory (NVRAM), or a magnetic storage device, such as a hard disk or a magnetic tape, or an optical disc, or any combination thereof for storing instructions or program code of communication protocol or applications.

It should be understood that the components described in the embodiment of FIG. 1 are for illustrative purposes only and are not intended to limit the scope of the application. For example, the wireless communication device may include more components to support other wireless technologies, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA2000) technology, Time Division-Synchronous Code Division Multiple Access (TD-SCDMA) technology, Worldwide Interoperability for Microwave Access (WiMAX) technology, Long Term Evolution (LTE) technology, Time-Division LTE (TD-LTE) technology, and LTE-Advanced (LTE-A) technology, etc.

Figure 2:
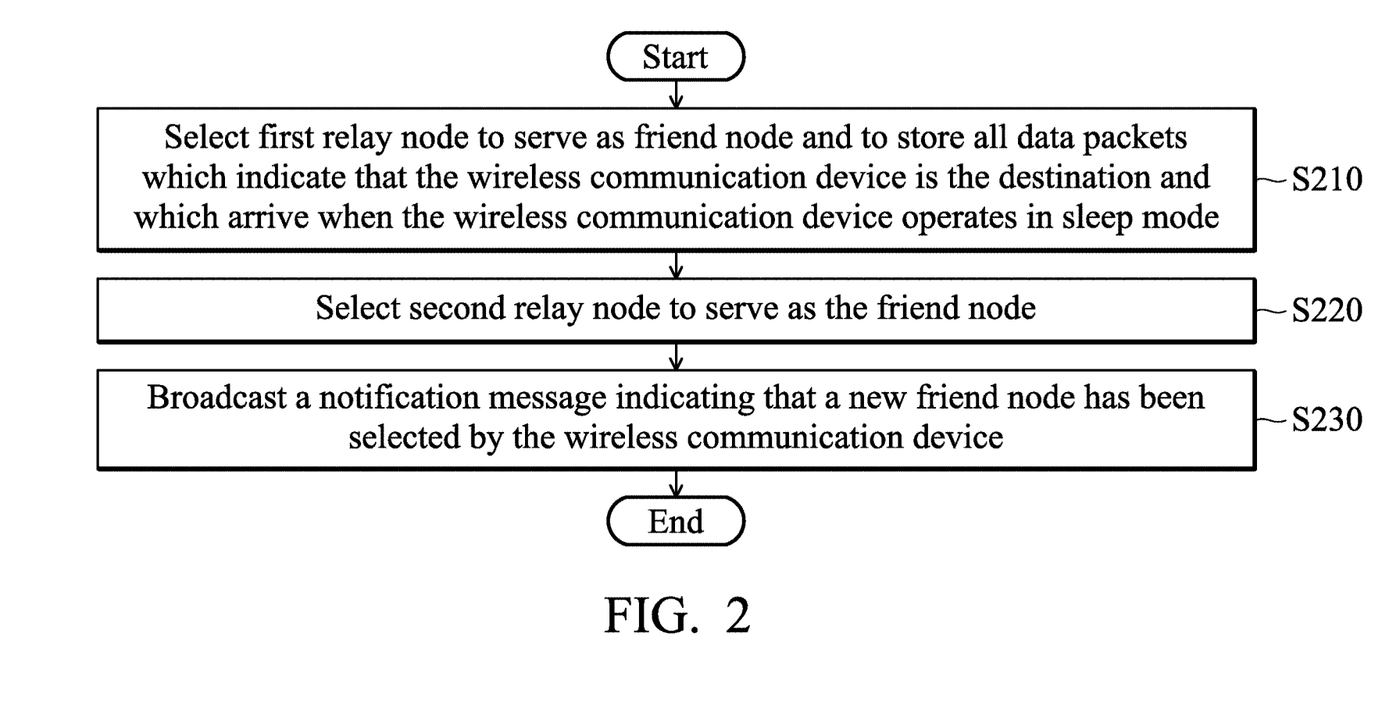
FIG. 2 is a flow chart illustrating the handover method for a wireless communication device serving as a destination node in a wireless mesh network according to an embodiment of the application.

FIG. 2 is a flow chart illustrating the handover method for a wireless communication device serving as a destination node in a wireless mesh network according to an embodiment of the application.

In this embodiment, the wireless mesh network is a Bluetooth mesh network supporting only a flooding-based propagation mechanism.

The destination node refers to an edge node which is the destination of one or more data packets propagated in the wireless mesh network. An edge node refers to a node which is located at the edge of the wireless mesh network and is unable to forward data packets to other nodes in the wireless mesh network.

To begin the handover method, the wireless communication device selects a first relay node to serve as a friend node for the wireless communication device and to store all data packets which indicate that the wireless communication device is the destination and which arrive when the wireless communication device operates in the sleep mode (step S210). That is, the friend node is responsible for forwarding data packets to the wireless communication device when the wireless communication device is in the operating mode and caching the data packets when the wireless communication device is in the sleep mode. In one embodiment, the wireless communication device selects one of its neighboring nodes, which has the best signal quality, to be its friend node.

In response to losing communication with the first relay node, the wireless communication device selects a second relay node to serve as the friend node (step S220). In one embodiment, the wireless communication device may lose communication with the first relay node due to the wireless communication device moving to a place too far away from the first relay node, or due to the first relay node moving away from the wireless communication device, making the first relay node unavailable to the wireless communication device.

In response to the friend node being reselected, the wireless communication device broadcasts a notification message indicating that a new friend node has been selected by the wireless communication device (step S230), and the method ends.

In one embodiment, the notification message is a Heartbeat Publication message which may comprise a destination field with a broadcast address and a feature field with a low power indication. For other detailed descriptions of the Heartbeat Publication message, please refer to the Bluetooth Mesh Routing specifications (revision number: d09r10).

Figure 3:
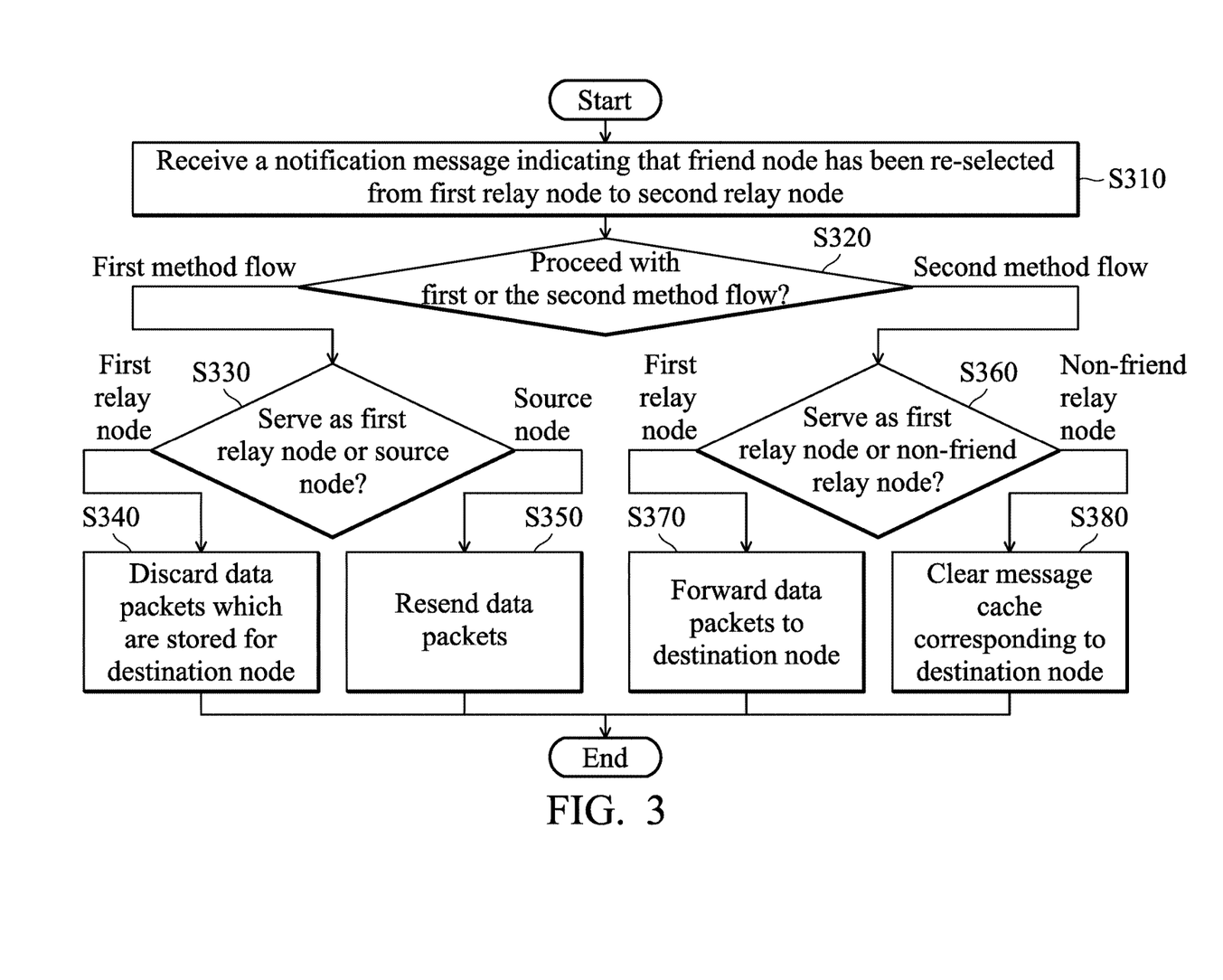
FIG. 3 is a flow chart illustrating the handover method for a wireless mesh network which comprises a wireless communication device serving as a relay node or a source node in the wireless mesh network according to an embodiment of the application.

FIG. 3 is a flow chart illustrating the handover method for a wireless mesh network which comprises a wireless communication device serving as a relay node or a source node in the wireless mesh network according to an embodiment of the application.

In this embodiment, the wireless mesh network is a Bluetooth mesh network supporting only a flooding-based propagation mechanism.

The relay node refers to an intermediate node which is not located at the edge of the wireless mesh network and is able to forward data packets to other nodes in the wireless mesh network. The source node refers to a node which originates propagation of one or more data packets in the wireless mesh network.

To begin the handover method, the wireless communication device receives a notification message indicating that a friend node for a destination node of the data packets has been re-selected from a first relay node to a second relay node (step S310). That is, the first relay node is the old friend node, while the second relay node is the new friend node.

In one embodiment, the notification message is a Heartbeat Publication message which may comprise a destination field with a broadcast address and a feature field with a low power indication. For other detailed descriptions of the Heartbeat Publication message, please refer to the Bluetooth Mesh Routing specifications (revision number: d09r10).

In response to receiving the notification message, the wireless communication device determines whether to proceed with the first method flow or the second method flow (step S320).

Subsequent to step S320, if the first method flow is preferred, the wireless communication device determines whether it is configured to serve as the first relay node (i.e., the old friend node) or the source node which originated the propagation of the data packets (step S330).

In response to being configured to serve as the old friend node, the wireless communication device discards the data packets which are stored for the destination node (S340). In response to being configured to serve as the source node, the wireless communication device resends the data packets (step S350).

Subsequent to step S320, if the second method flow is preferred, the wireless communication device determines whether it is configured to serve as the first relay node (i.e., the old friend node) or a relay node other than the first relay node and the second relay node (i.e., a non-friend relay node) (step S360).

In response to being configured to serve as the old friend node, the wireless communication device forwards the data packets to the destination node (S370). In response to being configured to serve as a non-friend node, the wireless communication device clears the message cache corresponding to the destination node (step S380). Specifically, the message cache is used to store the messages or data packets that have been forwarded, so that the same messages or data packets will not be forwarded by the same node more than once.

The method ends subsequent to steps S340, S350, S370, and S380.

In another embodiment, the wireless communication device may further determines a hop count from the second relay node to the first relay node, or from the second relay node to the wireless communication device, while the destination node may include a method selection indication in the notification message, which is determined according to the result of whether the hop count is greater than a predetermined threshold.

Figure 4A:
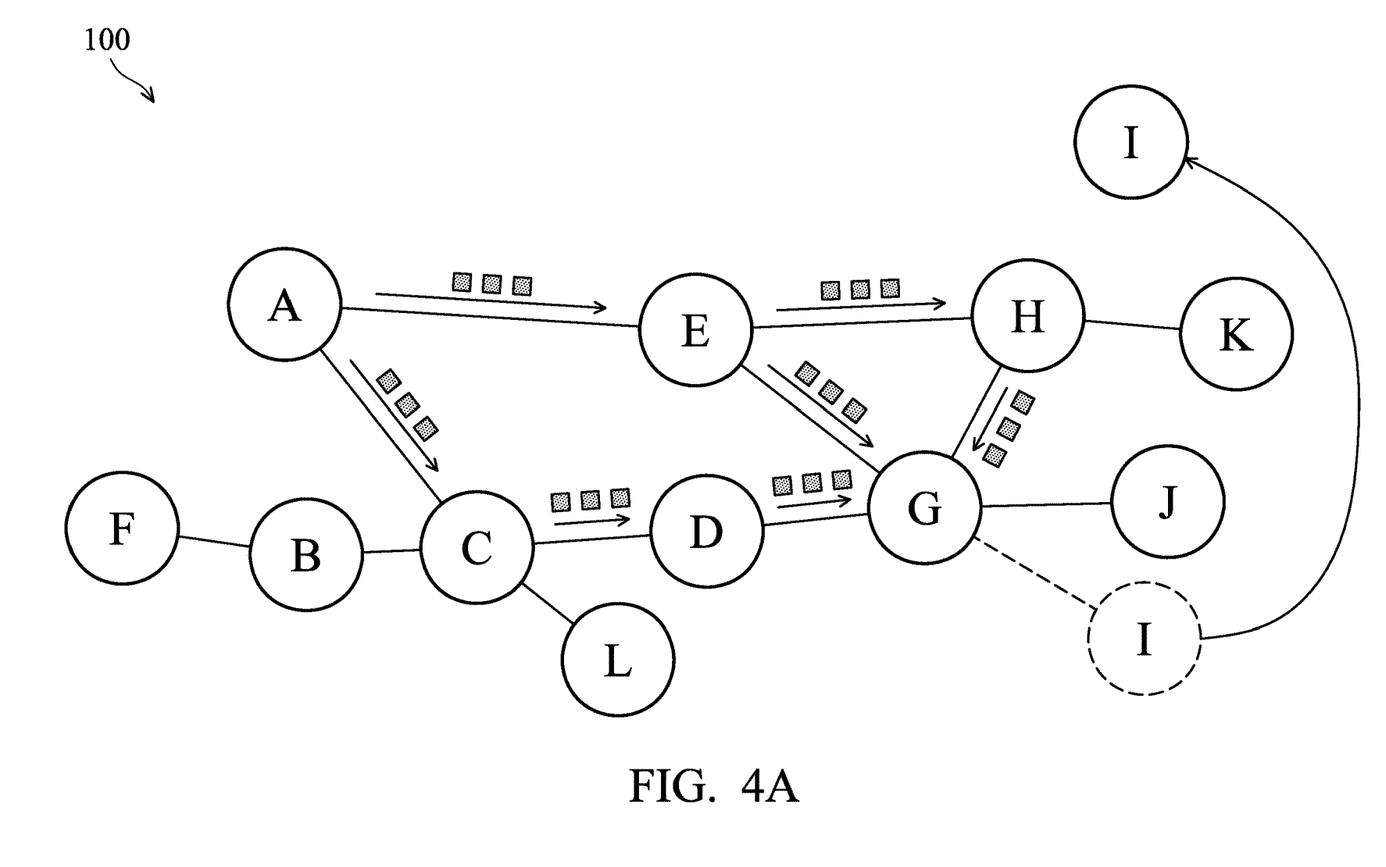
FIGS. 4A to 4C show schematic diagrams illustrating data packet propagation with a handover of the destination node from an old friend node to a new friend node according to an embodiment of the application.
Figure 4B:
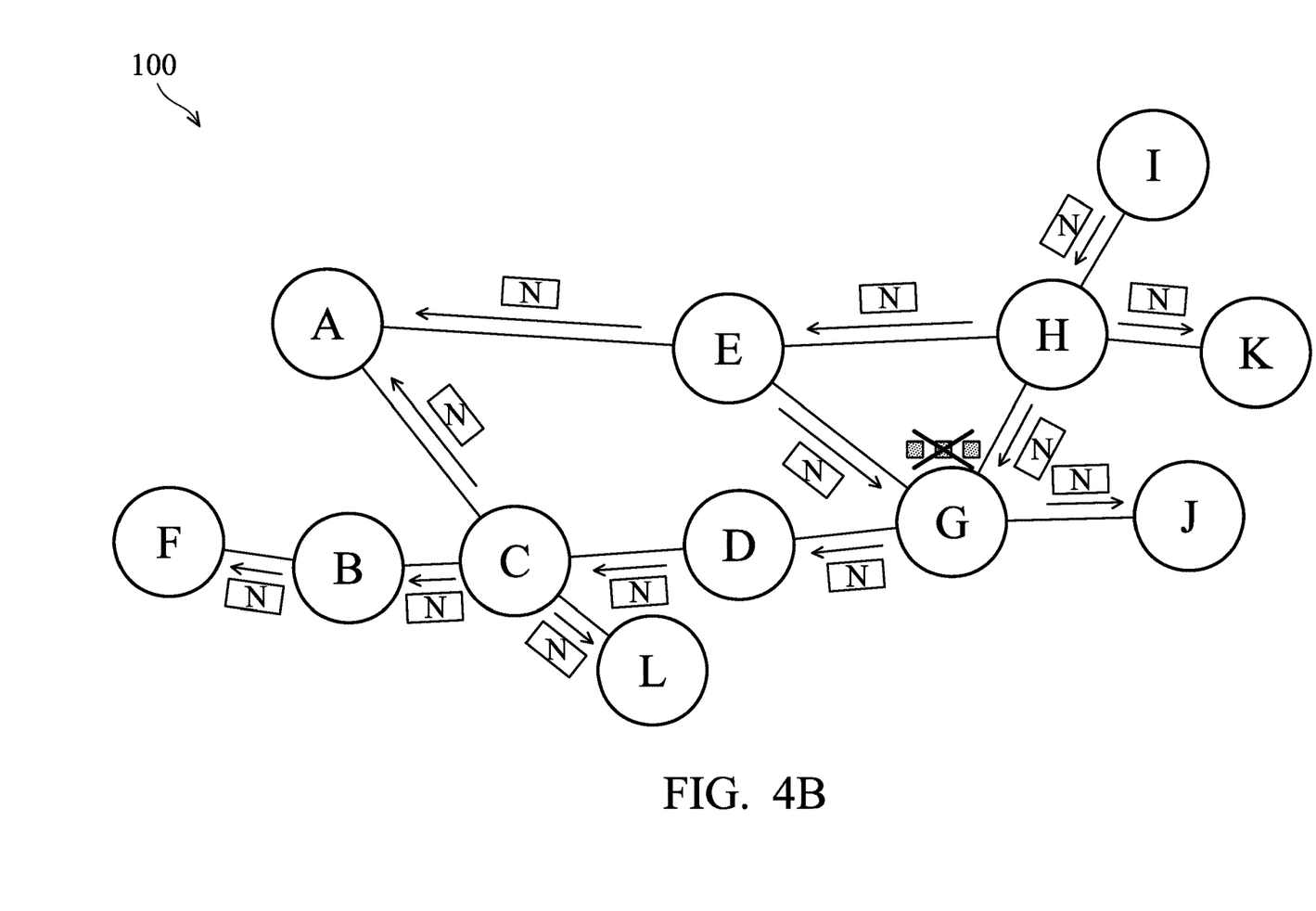
Figure 4C:
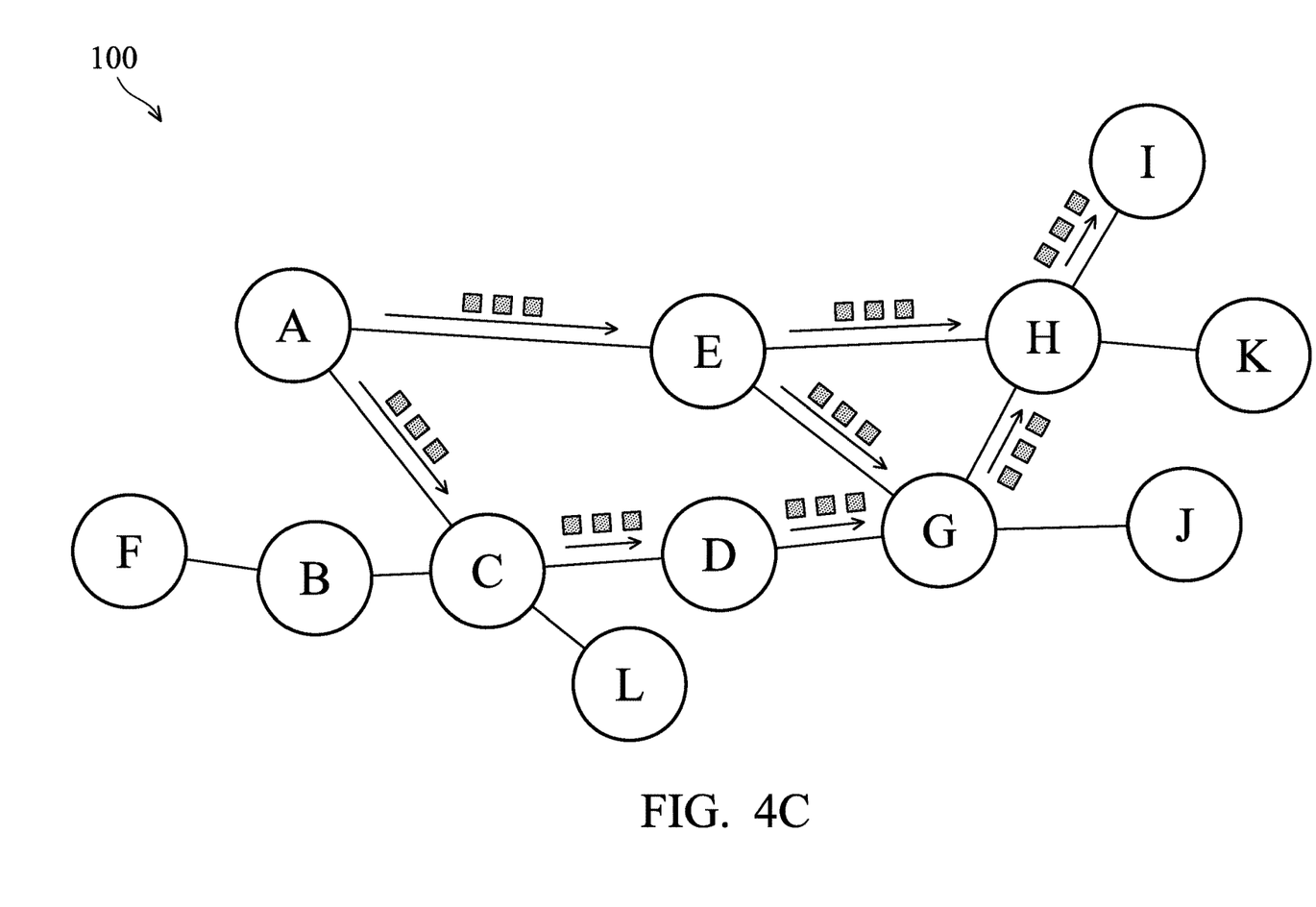

FIGS. 4A to 4C show schematic diagrams illustrating data packet propagation with a handover of the destination node from an old friend node to a new friend node according to an embodiment of the application. The wireless mesh network 100 includes a plurality of wireless communication devices A to L, wherein the wireless communication devices A, F, I, J, K, L are edge nodes which are unable to forward data packets and the wireless communication devices B, C, D, E, G, H are relay nodes which have the ability to forward data packets using the flooding-based propagation mechanism.

As shown in FIG. 4A, the wireless communication device A originates propagation of three data packets to the wireless communication device I. In this embodiment, the wireless communication device G is the friend node for the wireless communication device I. However, before the data packets are delivered to the wireless communication device I, the wireless communication device I has moved out of reach of the wireless communication device G. Therefore, the wireless communication device G stores the data packets for the wireless communication device I.

As shown in FIG. 4B, the wireless communication device I has reselected the wireless communication device H to be its new friend node, and in response to the new friendship being established, the wireless communication device I broadcasts a notification message (denoted as a block marked with N in FIG. 4B) to every other node in the wireless mesh network to indicate that a new friend node has been selected by the wireless communication device I. When receiving the notification message, the wireless communication device G discards the data packets stored for the wireless communication device I.

In another embodiment, when receiving the notification message, the new friend node, i.e., the wireless communication device H, may broadcast a clearance message to the wireless communication device G. When receiving the clearance message, the wireless communication device G discards the data packets stored for the wireless communication device I.

As shown in FIG. 4C, when receiving the notification message, the wireless communication device A resends the data packets, and the resent data packets are propagated to the wireless communication device I through the new friend node, i.e., the wireless communication device H.

Figure 5:
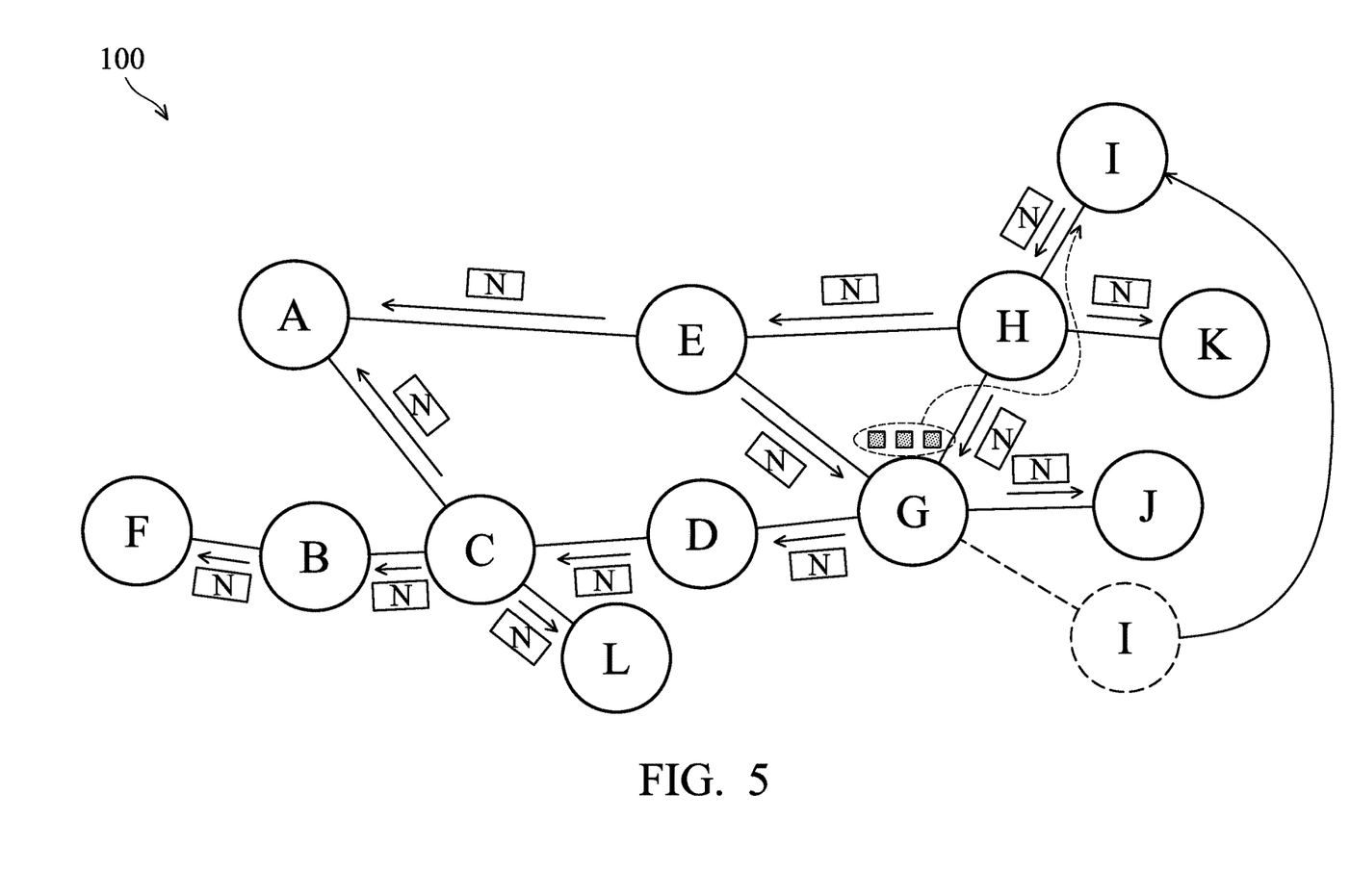
FIG. 5 is a schematic diagram illustrating data packet propagation with a handover of the destination node from an old friend node to a new friend node according to another embodiment of the application.

FIG. 5 is a schematic diagram illustrating data packet propagation with a handover of the destination node from an old friend node to a new friend node according to another embodiment of the application. The network topology is similar to that of the wireless mesh network 100 in FIG. 4A.

In this embodiment, it is assumed that the wireless communication device A had originated propagation of three data packets to the wireless communication device I, but the data packets are not delivered to the wireless communication device I due to that the wireless communication device I has moved out of reach of its current friend node, i.e., the wireless communication device G. Therefore, the wireless communication device G stores the data packets for the wireless communication device I.

As shown in FIG. 5, the wireless communication device I has reselected the wireless communication device H to be its new friend node, and in response to the new friendship being established, the wireless communication device I broadcasts a notification message (denoted as a block marked with N in FIG. 5) to every other node in the wireless mesh network to indicate that a new friend node has been selected by the wireless communication device I. When receiving the notification message, every node except the wireless communication device G clears its message cache corresponding to the wireless communication device I, and the wireless communication device G forwards the data packets stored for the wireless communication device I to the wireless communication device I.

Please note that, in the embodiment of FIG. 5, since all nodes other than the wireless communication device G have cleared their message cache corresponding to the wireless communication device I, the data packets forwarded by the wireless communication device G are successfully delivered to the wireless communication device I after the handover.

In view of the forgoing embodiments, it will be appreciated that the present application realizes efficient handover and message cache management for flood-relaying based mesh networks, by allowing the destination node to proactively send a notification message upon establishment of new friendship, to enable the cached data packets to be resent or forwarded without waiting for expiry of the guard timer for packet transmission. Advantageously, the latency for delivering the data packets to the destination node may be reduced and the management of message cache resources in the friend node may be improved.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

What is claimed is:

1. A wireless communication device, serving as a destination node of one or more data packets propagated in a wireless mesh network, comprising:
    a wireless transceiver configured to perform wireless transmission and reception in the wireless mesh network; and
    a controller configured to select a first relay node to serve as a friend node for the wireless communication device and to store the data packets which arrive when the wireless communication device operates in a sleep mode, and broadcast, via the wireless transceiver, a notification message in the wireless mesh network when selecting a second relay node to serve as the friend node for the wireless communication device.

2. The wireless communication device as claimed in claim 1, wherein the notification message indicates that a new friend node has been selected by the wireless communication device.

3. The wireless communication device as claimed in claim 1, wherein the wireless mesh network is a Bluetooth mesh network supporting only a flooding-based propagation mechanism, and the notification message is a Heartbeat Publication message.

4. A handover method for a wireless communication device serving as a destination node of one or more data packets propagated in a wireless mesh network, comprising:
    selecting a first relay node to serve as a friend node for the wireless communication device and to store the data packets which arrive when the wireless communication device operates in a sleep mode; and
    broadcasting a notification message in the wireless mesh network when selecting a second relay node to serve as the friend node for the wireless communication device.

5. The handover method as claimed in claim 4, wherein the notification message indicates that a new friend node has been selected by the wireless communication device.

6. The handover method as claimed in claim 4, wherein the wireless mesh network is a Bluetooth mesh network supporting only a flooding-based propagation mechanism, and the notification message is a Heartbeat Publication message.

7. A wireless communication device, serving as a relay node or a source node of one or more data packets propagated in a wireless mesh network, the wireless communication device comprising:

a wireless transceiver configured to perform wireless transmission and reception in the wireless mesh network; and a controller configured to perform a plurality of first steps or a plurality of second steps, in response to receiving, via the wireless transceiver, a notification message indicating that a friend node for a destination node of the data packets has been re-selected from a first relay node to a second relay node;

wherein the first steps comprise: discarding the data packets which are stored for the destination node when the wireless communication device is configured to serve as the first relay node, and resending the data packets via the wireless transceiver when the wireless communication device is configured to serve as the source node which originated the propagation of the data packets; and the second steps comprise: clearing a message cache corresponding to the destination node when the wireless communication device is configured to serve as a relay node other than the first relay node, and forwarding, via the wireless transceiver, the data packets when the wireless communication device is configured to serve as the first relay node.

8. The wireless communication device as claimed in claim 7, wherein the first steps further comprise: broadcasting, via the wireless transceiver, a clearance message when the wireless communication device is configured to serve as the second relay node, thereby causing the first relay node to discard the data packets.

9. The wireless communication device as claimed in claim 7, wherein the wireless mesh network is a Bluetooth mesh network supporting only a flooding-based propagation mechanism, and the notification message is a Heartbeat Publication message.

10. A handover method for a wireless mesh network, wherein the wireless mesh network comprises a wireless communication device serving as a relay node or a source node of one or more data packets propagated in the wireless mesh network, the handover method comprising:

in response to receiving, by the wireless communication device, a notification message indicating that a friend node for a destination node of the data packets has been re-selected from a first relay node to a second relay node, discarding, by the wireless communication device, the data packets which are stored for the destination node when the wireless communication device is configured to serve as the first relay node, and resending, by the wireless communication device, the data packets when the wireless communication device is configured to serve as the source node which originated the propagation of the data packets; or clearing, by the communication device, a message cache corresponding to the destination node when the wireless communication device is configured to serve as a relay node other than the first relay node, and forwarding, by the communication device, the data packets when the wireless communication device is configured to serve as the first relay node.

11. The handover method as claimed in claim 10, further comprising:

broadcasting, by the communication device, a clearance message when the wireless communication device is configured to serve as the second relay node, thereby causing the first relay node to discard the data packets.

12. The handover method as claimed in claim 10, wherein the wireless mesh network is a Bluetooth mesh network supporting only a flooding-based propagation mechanism, and the notification message is a Heartbeat Publication message.

13. The handover method of claim 10, wherein the wireless communication device determines a hop count from the second relay node to the first relay node, or from the second relay node to the wireless communication device, and the destination node includes a method selection indication in a notification message, which is determined according to the result of whether the hop count is greater than a predetermined threshold.

* * * * *